Figure 1:
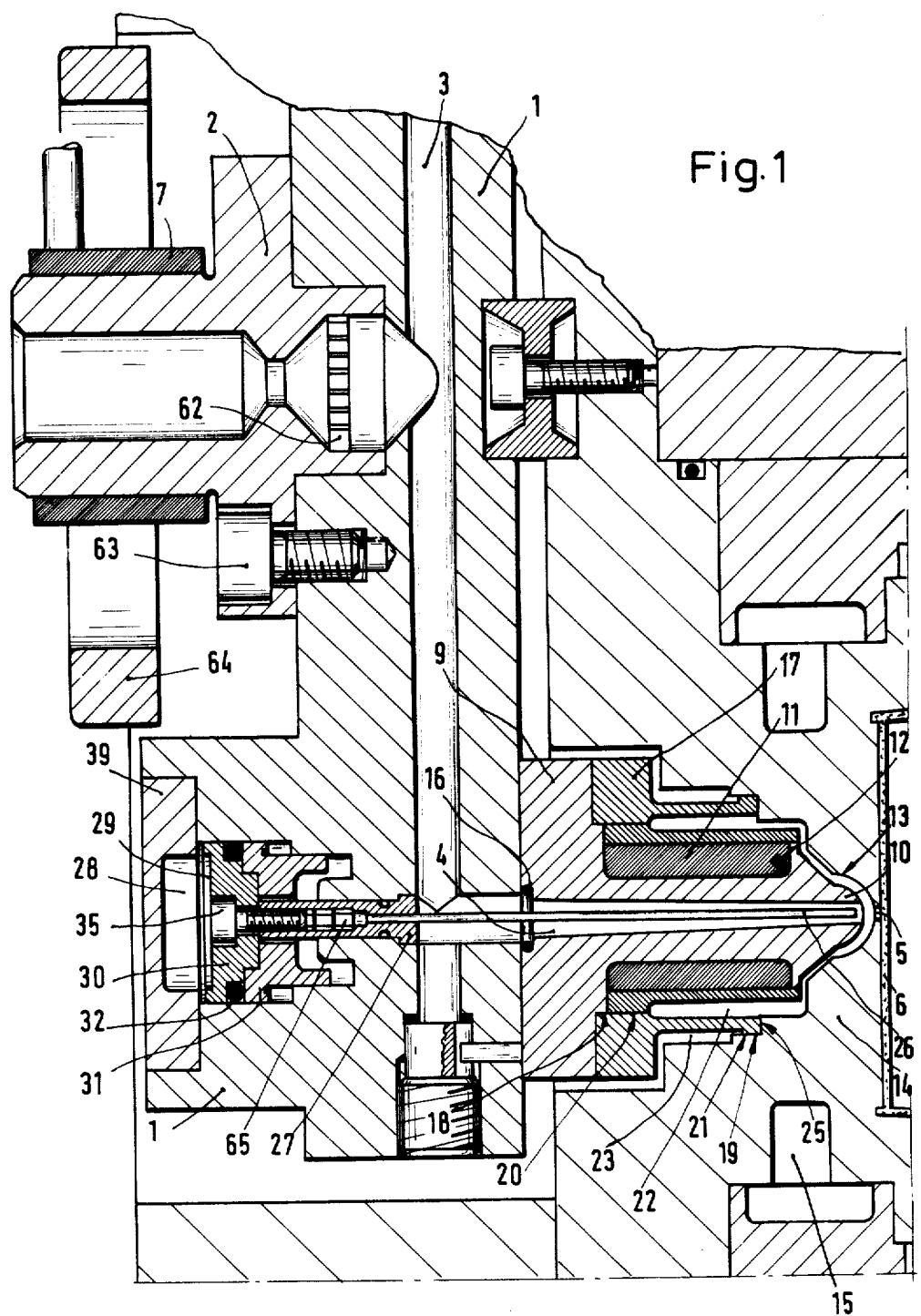

United States Patent [19]

Schouenberg

[11] 4,378,963

[45] Apr. 5, 1983

[54] INJECTION MECHANISM FOR MOLDING PLASTICS

[76] Inventor: Hendrikus J. E. Schouenberg, Burg. Stolklaan 16, 4002 WJ Tiel, Netherlands

[21] Appl. No.: 215,545

[22] Filed: Dec. 11, 1980

[51] Int. Cl.³ .............................. B29F 1/03; B29F 1/05
[52] U.S. Cl. .................................... 425/144; 425/548; 425/549; 425/564; 425/570; 425/572; 425/588; 264/328.8
[58] Field of Search ............... 425/564, 565, 566, 570, 425/572, 144, 548, 549, 588; 264/328.8

[56] References Cited

U.S. PATENT DOCUMENTS 2,865,050 12/1958 Strauss ........................... 425/564 X
4,212,627 7/1980 Gellert ........................... 425/566 X

FOREIGN PATENT DOCUMENTS 2613173 9/1977 Fed. Rep. of Germany ...... 425/570

Primary Examiner—Thomas P. Pavelko

Attorney, Agent, or Firm—Shlesinger, Arkwright, Garvey & Dinsmore

[57] ABSTRACT

The invention relates to an injection mechanism for molding plastics, comprising at least one injection bushing, at least one lower needle valve, which is supplied by the injection bushing with molten plastics and opened by the pressure of the molten plastics during injection, further comprising heating means and cooling means adjacent to the flow path of the plastics, control means for maintaining the plastics at an adjusted temperature, further control means for injecting the molten plastics into at least one mold cavity via a corresponding injection aperture, and for the closing off the mold cavity after finishing the injection, wherein for improving this mechanism, especially for facilitating very small distances between injection openings, only one plunger within a heated distributor block is provided, which actuates several needle valves, situated at different locations within the distributor block, for supplying the molten plastics to the mold cavity via one single injection bushing, an injection nozzle and several lower injection openings.

20 Claims, 19 Drawing Figures

INJECTION MECHANISM FOR MOLDING PLASTICS

The invention relates to an injection mechanism for molding plastics in at least one mold cavity, the injection mechanism having at least one injection nozzle and at least one lower needle valve supplied with molten plastics from an injection bushing.

In injection molding arrangements for injection molding of products of plastics or other materials, these products are usually injected by way of a runner which is provided with a sprue. The injected products are then removed from this runner. If it is desirable to omit the runner, an arrangement is used with which it is possible to utilize runnerless injection molding.

In such an arrangement for runnerless injection molding of products, one or more injection nozzles are assembled on a heated distribution block, which is spaced from the injection machine. Molten plastics flow from the injection molding machine through radially extending distributor channels in the heated distributor block downward through the injection nozzles and by way of an injection aperture into the product cavity.

The products which are injection molded in the fashion may exhibit injection spots which can very negatively affect the function or the appearance of the injection molded products. In order to mold products which absolutely must not exhibit injection spots, needle valves must be utilized, which are installed in the injection nozzles and/or in the heated distributor block, these needle valves must be opened at the beginning of the injection into the cavity of the molten plastics and will close off the injection apertures in the product cavity after completion of the entire injection cycle.

The bottom point of each needle valve is forcibly driven into the conical injection aperture of the product cavity and, as is well known, the most critical function of such an arrangement lies in the injection aperture, where improper functioning can cause costly break down of the injection machine or imperfections in the molded product.

The lower apertures of the injection nozzle are separated from the cavity plate by an air space, which is filled with plastics and which provides a thermal insulation between the hot nozzles and the cold cavity plate.

In injection molding arrangements for the production particularly of products of small dimensions, this arrangement requires several injection nozzles. Until the present time the minimal center distances between individual needle valves has been determined by their activating mechanism, each needle valve is activated separately and for this a certain minimal space is required. The center distances in the injection arrangement for small products to be injection molded is therefore entirely dependent on the minimal center distance which can be attained with separately activated needle valve mechanisms.

Until the present time injection nozzles for this purpose have been designed such that for each selection of the manner of injection or the injection aperture, a different injection nozzle is required.

The manner of injection can be among others, the so-called open nozzle, the nozzle provided with a fixed body in the injection aperture; the nozzles provided with a fixed, heated torpedo; a nozzle which is provided with a needle valve.

Up to the present, a conscious selection is also required concerning the application of the manner of injection, if the applicable injection nozzle is placed centrally in the injection mold or if the injection nozzle is used in a hot runner design.

Up to now, it is also necessary for the processing of certain types of plastics to make a conscious selection of the manner of injection, to commit to a certain type injection nozzle.

It is evident that many types of injection nozzles must be purchased, in most cases with different dimensions and matching heights, thus not universally interchangeable.

In injection molding arrangements for the production particularly of small products, this arrangement requires several injection nozzles. Up to the present time, the minimum center distances of the individual injection apertures have been determined by the sizes of the injection nozzles to be used, resulting in a minimum distance between injection apertures.

It is the object of invention to avoid the disadvantages of the above-mentioned large variety of the injection nozzles to be used, and to facilitate very small center distances in an injection mechanism for molding plastics, comprising at least one injection bushing, at least one lower needle valve, which is supplied by the injection bushing with molten plastics and opened by the pressure of the molten plastics during injection, further comprising heating means and cooling means adjacent to the flow path of the plastics, control means for maintaining the plastics at an adjusted temperature, further control means for injecting the molten plastics into at least one mold cavity via a corresponding injection aperture, and for the closing of the mold cavity after finishing the injection.

The object of the invention is achieved by an injection mechanism wherein only one plunger within a heated distributor block is provided, which actuates several needle valves, situated at different locations within the distributor block, for supplying the molten plastics to the mold cavity via one single injection bushing, an injection nozzle, and several lower injection openings.

The purpose of this invention is among other things to facilitate very small center distances between injection apertures. In this invention this purpose is realized in that several needle valves are placed at very small center distances (minimum center distance is 3 mm) from each other in a single injection nozzle, which is provided with as many lower apertures as the injection nozzle contains needle valves. These needle valves are then activated by a plunger, which has been placed in the heated distributor block to which the injection nozzle is assembled. The plunger may be actuated pneumatically, hydraulically or by one or more springs and its motion may be derived from a mechanism outside the part in which the injection mechanism is installed. If the needle valves are mounted directly in the plunger, the plunger must be double acting.

In applying such an injection nozzle several products can be injection molded with a single injection nozzle or a single large product can be injection molded through a single injection nozzle in several places, the injection nozzle being provided with needle valves in both cases.

The main advantage of this new application is, in addition, that the needle valves are directly activated by a single plunger which is located in the heated distributor block and that in this way less height for assembly in an injection molding arrangement can be attained. The realization of this construction is such that this combination of plunger, needle valve, injection nozzle and heated distributor block, after assembly is one entity and can therefore be held within very close tolerances.

Another additional essential advantage is that in applying several injection nozzles, every plunger in the heated distributor block is activated and controlled separately from outside the injection molding arrangement, also during the injection molding process.

Another important advantage is achieved by the structure of the invention in that the needle valves can be exchanged or their axial positions can be adjusted, this latter case through the use of a spacer bushing underneath the head of the needle, without the necessity to disassemble the injection molding arrangement.

To simplify the assembly and disassembly of these needles the axially adjustable guide bushing in the plunger is prevented from rotating in that it is provided with one or more flat spots, which are in contact with one or more corresponding flats in the plunger.

Another purpose of the invention is to reduce the center distances between the locations where injection occurs through the use of a single injection nozzle as described above, but without utilizing needle valves.

In order to facilitate full understanding of the above-mentioned parts of the invention through which a 100% breakdown-free injection arrangement is aimed at, the parts which are required for the application of the invention and will be part and parcel of it, will now be described.

Because the injection nozzle contains several lower injection apertures which protrude with respect to it and since it is necessary to place the lower injection apertures as close to each other as possible, and because it is desirable to obtain the correct location of the lower apertures with respect to the injection openings in the cavity plates, a spacer and centering bushing is utilized, which correctly centers the entire injection nozzle with respect to the cavity plate so that the lower injection apertures are placed exactly opposite the injection openings.

In injection molding of certain types of plastics such as polycarbonate, P.V.C., acetate, nylon, acrylates and other high quality plastics which have a narrow range of processing parameters such as melting temperature within which these can be properly processed, especially in the vicinity of the lower aperture, care should be taken that at this location the temperature remains constantly at the correct value. This is attained mainly by producing the injection nozzle from a material with high heat conductivity, e.g. beryllium copper, and in heating this by means of an integrally cast, plastics-tight heating element, provided with a thermocouple, which should be placed as close as possible to the lower aperture.

Further, care has to be taken that little heat is lost through conduction from the injection nozzle to the cavity plate. In order to achieve this, the spacer and centering bushing has been designed as shown in the attached drawings, FIGS. 1 through 6.

In order to further reduce heat conduction losses from the heated distributor block and the injection nozzle, the heated distributor block is not in contact with the front plate of the injection molding arrangement, but assembled directly via the spacer and centering bushing to the cavity plate with high strength socket head cap screws.

In this manner, a compact assembly of the above-mentioned parts is obtained through which in the locations of the surfaces of contact of the spacer and centering bushing with the cavity plate the unit pressure against each other is so large (but still within permissable limits) that no plastics can leak through to the outside and thus a proper closure is obtained.

Making the surface of contact of the injection nozzle with the heated distributor block large with respect to the length of the injection nozzle, facilitates a proper and regular heat exchange between them, through which it even becomes possible, during the processing of plastics with a wide melting temperature range, to perform injection molding without separately heating the injection nozzle. All required heat is then coming from the heated distributor block and will flow easily to the lower injection apertures, because of the large area of contact with the injection nozzle. This is only possible with a small ratio of length to diameter. To obtain a proper closure between these two parts, a special gasket has been placed around the distributor channel. Because the above-mentioned surfaces are in flat contact only, the heated distributor block can expand freely as a result of the heat to be supplied to it and thus slides freely over the surface of the injection nozzle.

According to the subject matter to the invention, a single injection nozzle is provided with a heating element and a thermocouple and has one or more lower nozzles, as many as there are injection apertures, each with a free exit opening, and in which one or more externally adjustable fixed needles can be placed or omitted, or one or more externally adjustable needle valves. All above-mentioned manners of injection can be achieved in placing the injection nozzle centrally in the injection molding arrangement or installing this injection nozzle in a hot runner design.

The invention will now be illustrated with the aid of drawings for several application examples, in which:

FIG. 1—a cross-section through part of an arrangement for injection molding of plastics, provided with a single needle valve and in which the plunger has been placed in the heated distributor block, as part of the invention.

Figure 2:
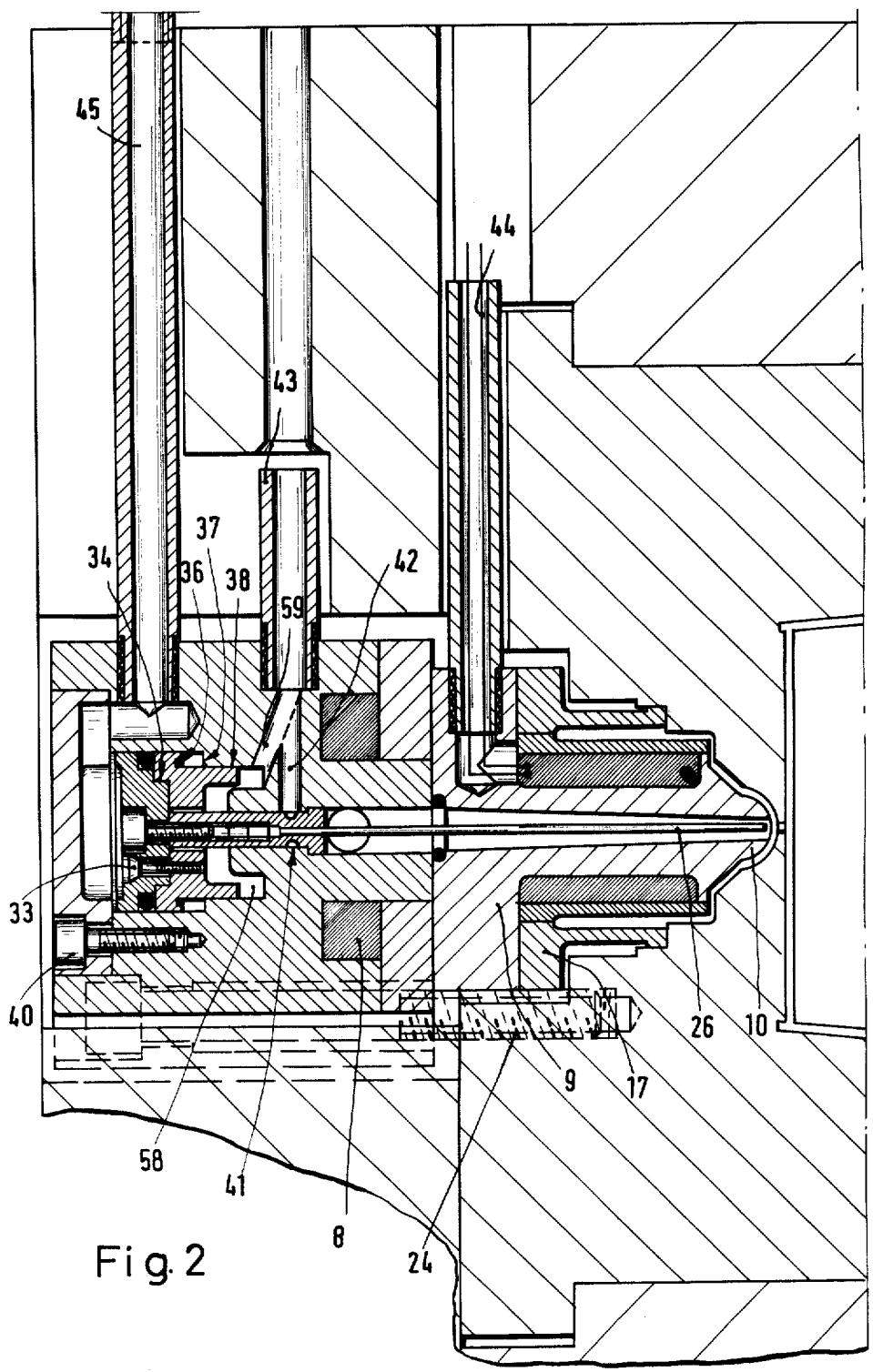

FIG. 2—a cross-section of FIG. 1, taken through the center line of the needle valve.

Figure 3:
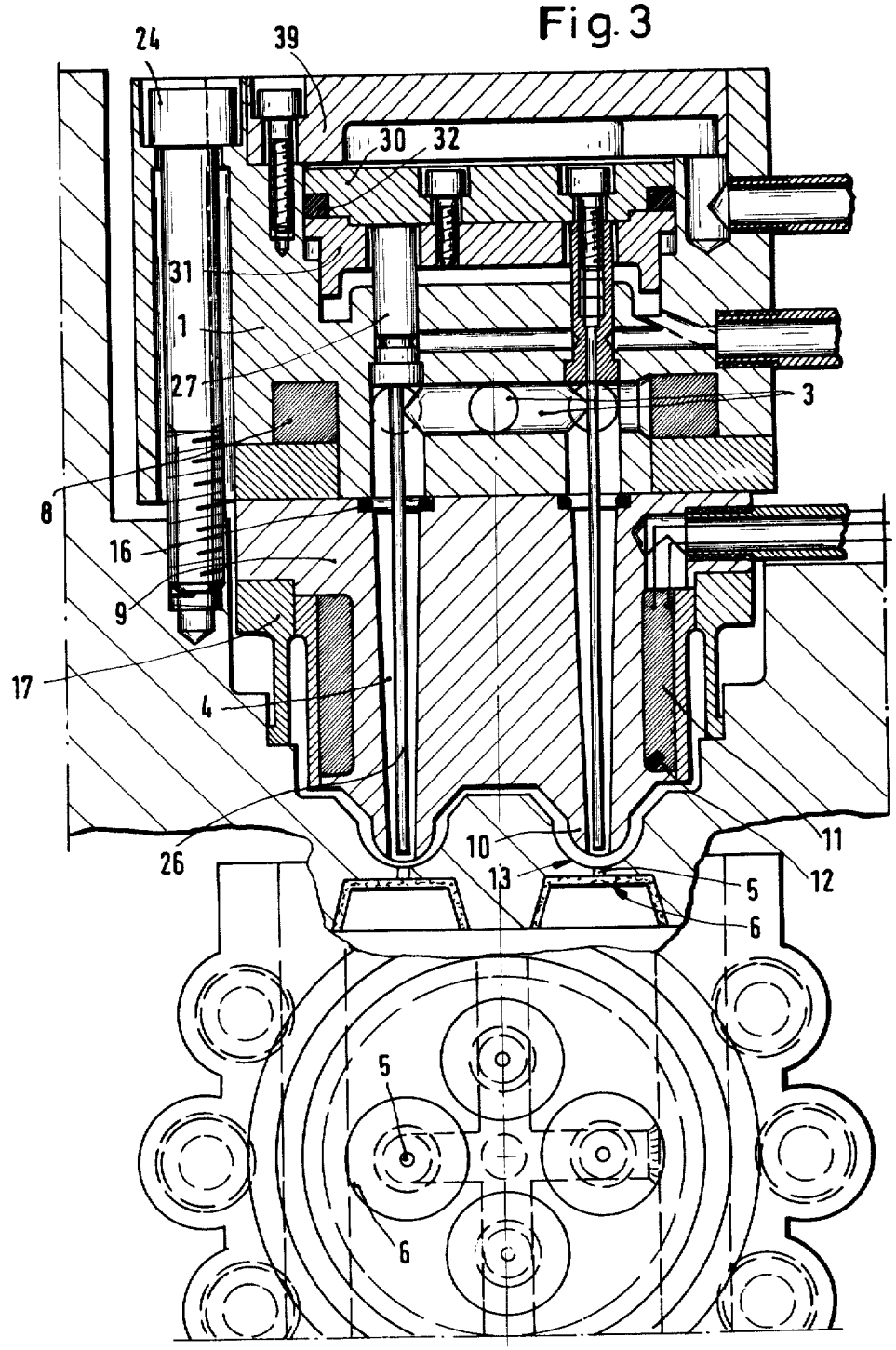

FIG. 3—a cross-section as shown in FIG. 2, but this time of a manifold application as covered in the invention.

Figure 4:
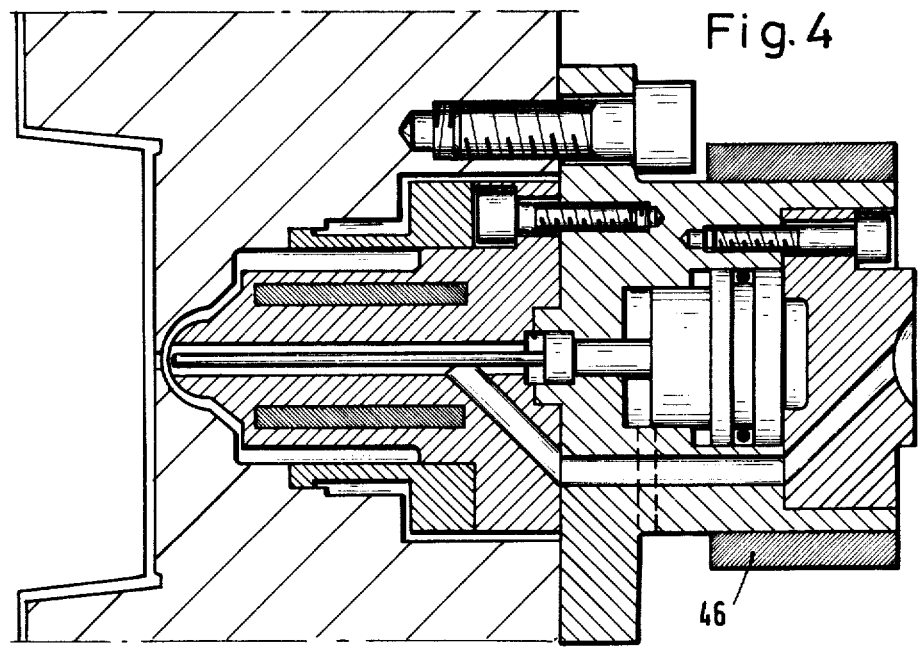

FIG. 4—a cross-section of a needle valve, activated by a plunger, applied centrally located in an injection molding arrangement and against which the injection nozzle of the injection machine is directly placed, as part and parcel of the invention.

Figure 5:
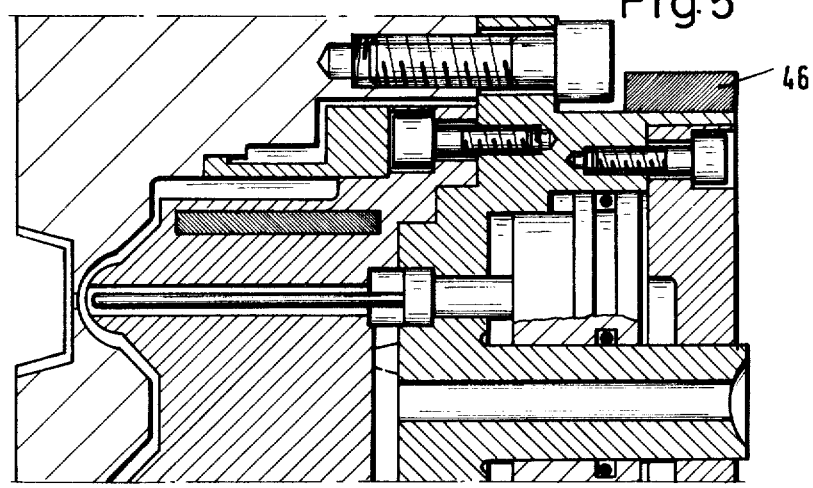

FIG. 5—a cross-section as shown in FIG. 4, but now in manifold application, as part of the invention.

Figure 6:
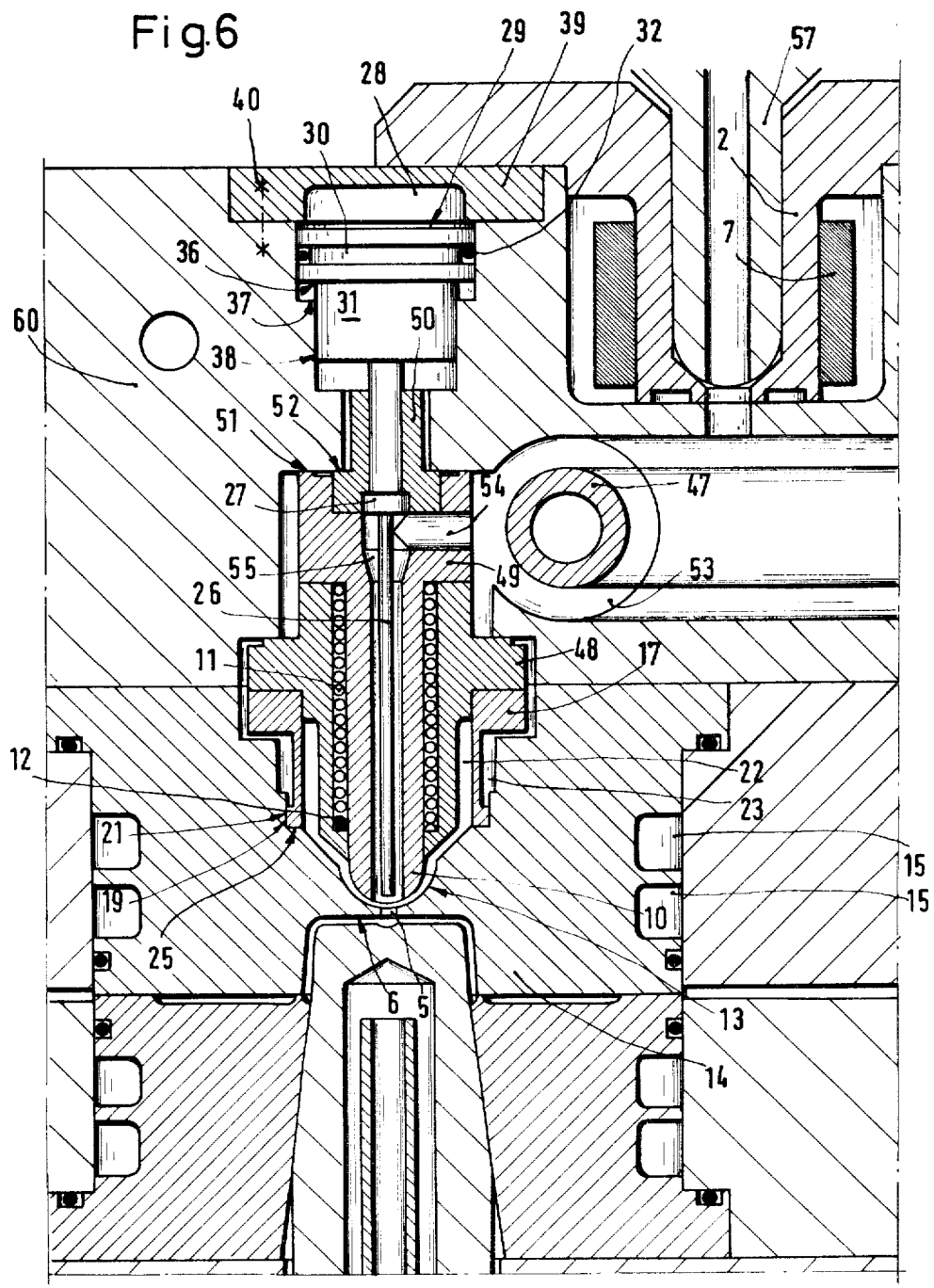

FIG. 6—A cross-section of a part of an arrangement for injection molding of plastics which is provided with a single needle valve and in which the plunger is placed within a part of a channel block which is not directly heated by a heating element, such as is, among other, the case in the runnerless injection molding arrangement "THE COOL ONE", marketed by DME in the U.S.A. which has its European Headquarters in Mechelen, Belgium. Naturally, this can also be used in a manifold application in accordance with the invention.

Figure 7:
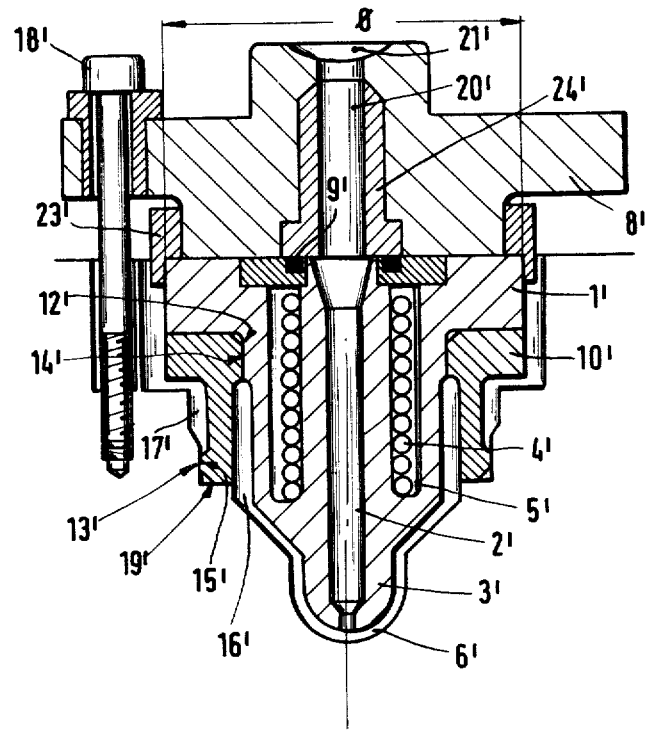

FIG. 7—a cross-section of the injection molding mechanism with a free injection aperture, placed centrally in an injection arrangement as part and parcel of the invention.

Figure 7A:
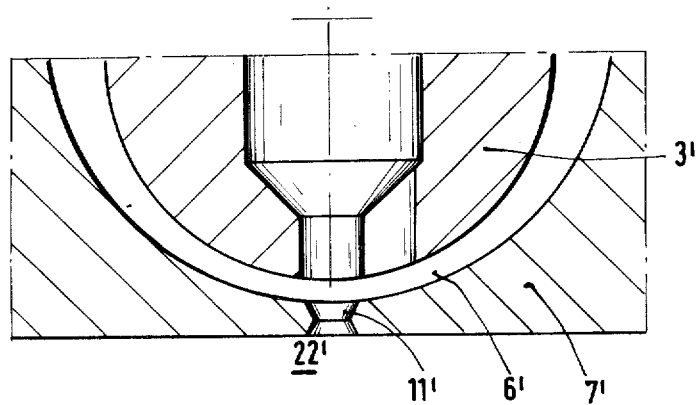

FIG. 7a—an enlarged fragmentary view of the arrangement of FIG. 7.

Figure 8:
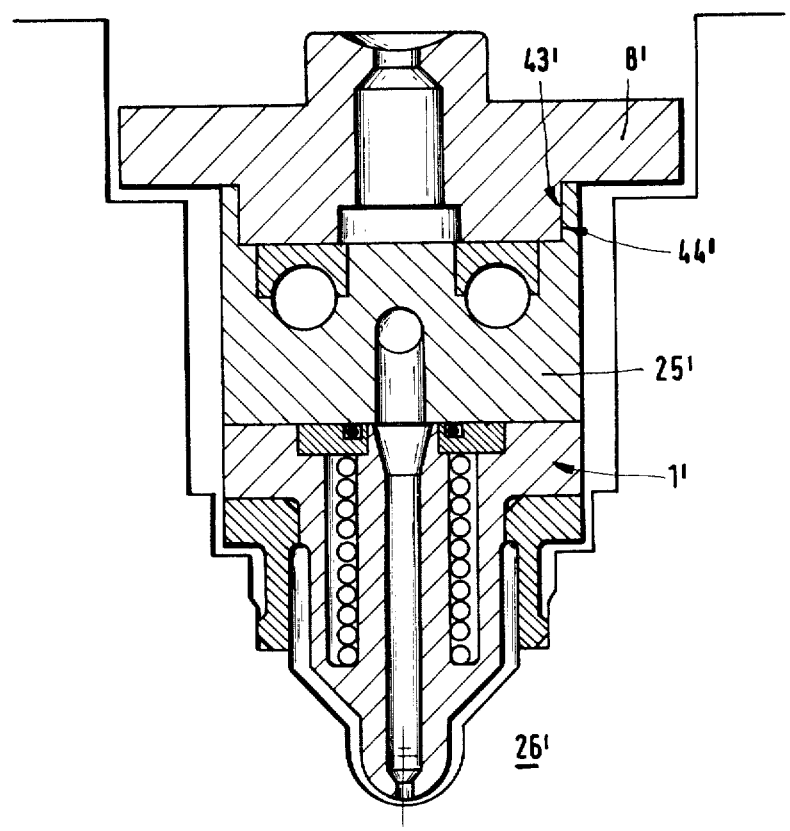
Figure 8A:
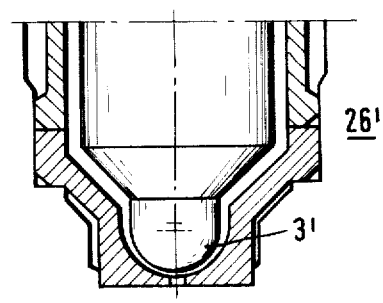

FIGS. 8 and 8a and an enlarged fragmentary cross-section—between "cross-section" and "of"—a cross-section of the injection molding mechanism with a free injection aperture, placed in a hot runner injection molding arrangement, as part and parcel of the invention.

Figure 9:
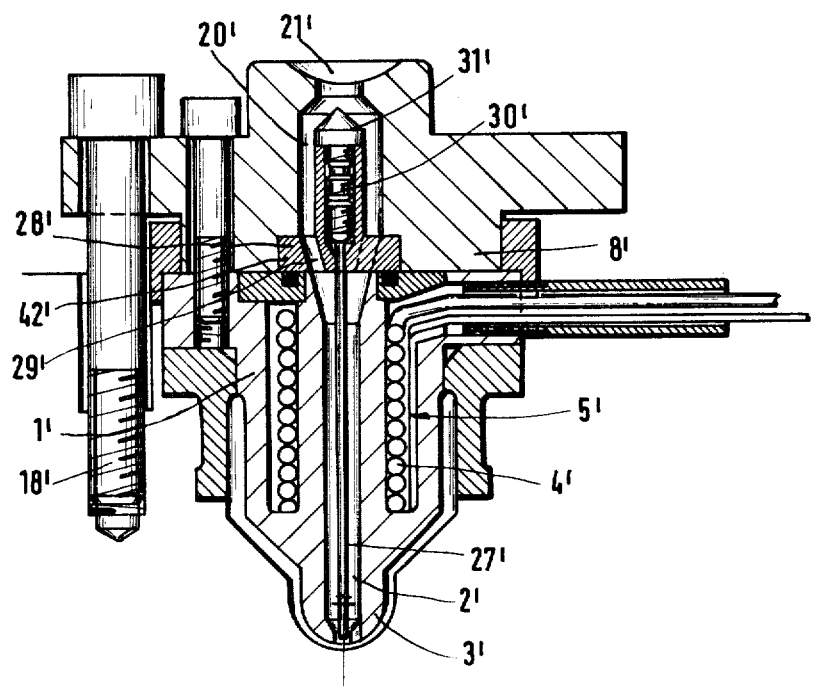

FIG. 9—a cross-section of the injection molding mechanism with a free injection aperture, in which opening has been placed a fixed needle which can be adjusted externally, which mechanism is placed centrally in an injection molding arrangement as part and parcel of the invention.

Figure 9A:
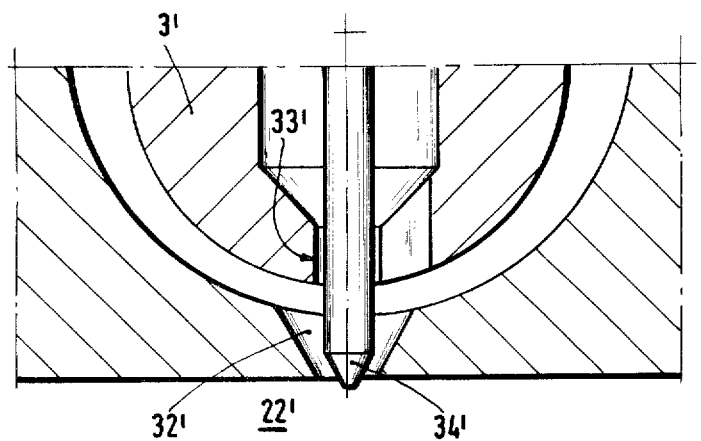

FIG. 9a—an enlarged fragmentary view of the arrangement of FIG. 9.

Figure 10:
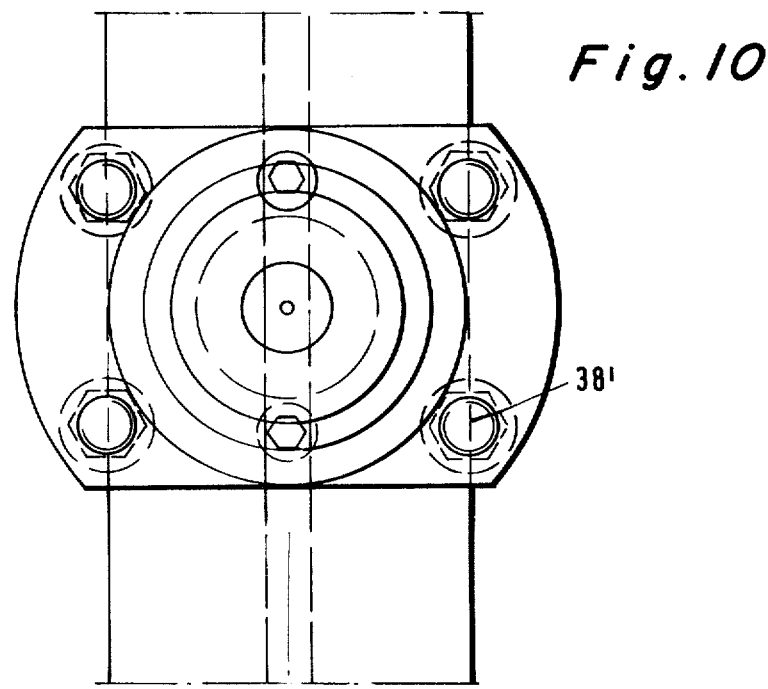
Figure 10A:
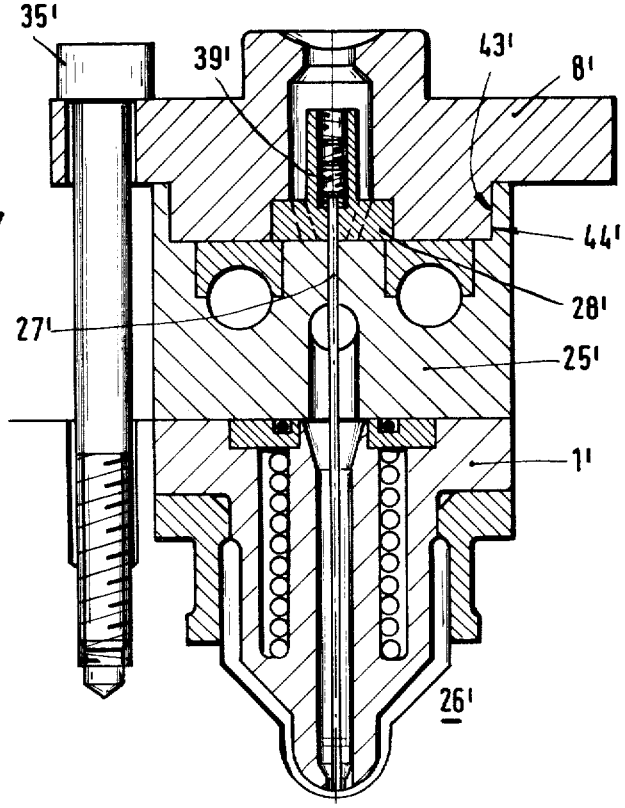

FIGS. 10 and 10a—a top plan and a cross-section of the injection mechanism, with a free injection aperture, in which has been placed a fixed needle which is externally adjustable, which mechanism has been placed in a hot runner injection molding arrangement, as part and parcel of the invention.

Figure 11:
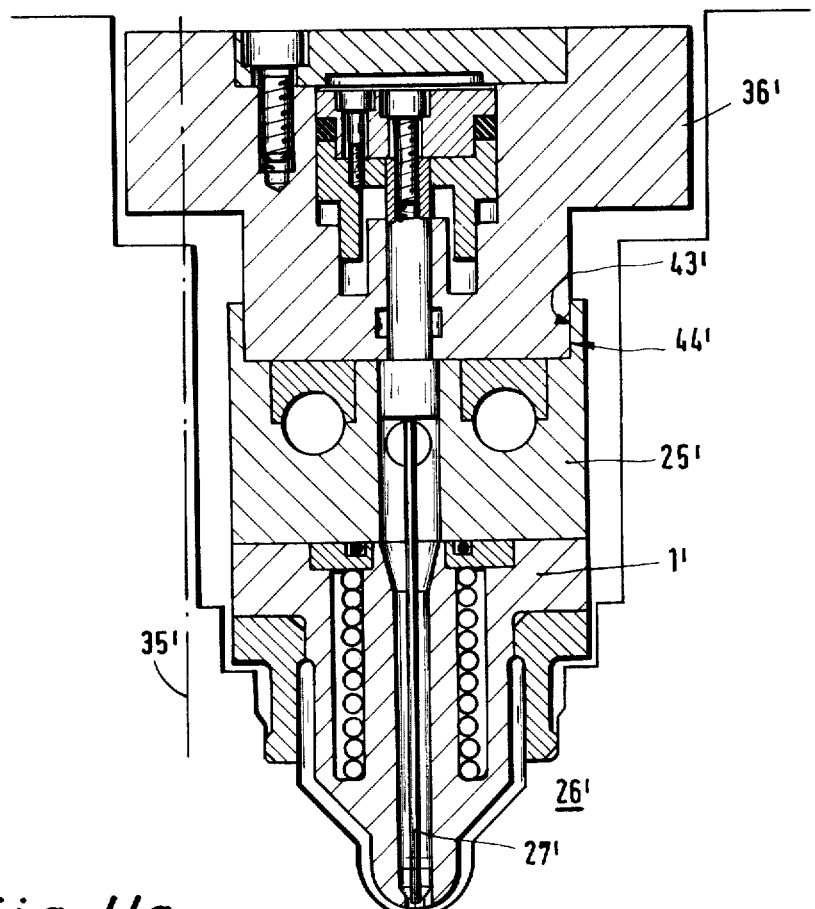

FIG. 11—a cross-section of the injection molding mechanism, with a free injection aperture, in which an externally adjustable needle valve has been placed, which is placed in a hot runner injection molding arrangement, as part and parcel of the invention.

Figure 11A:
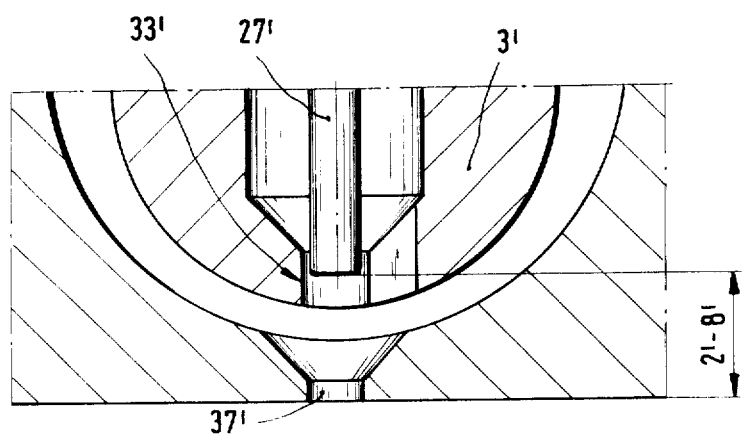

FIG. 11a—an enlarged fragmentary view of the arrangement of FIG. 11.

Figure 12:
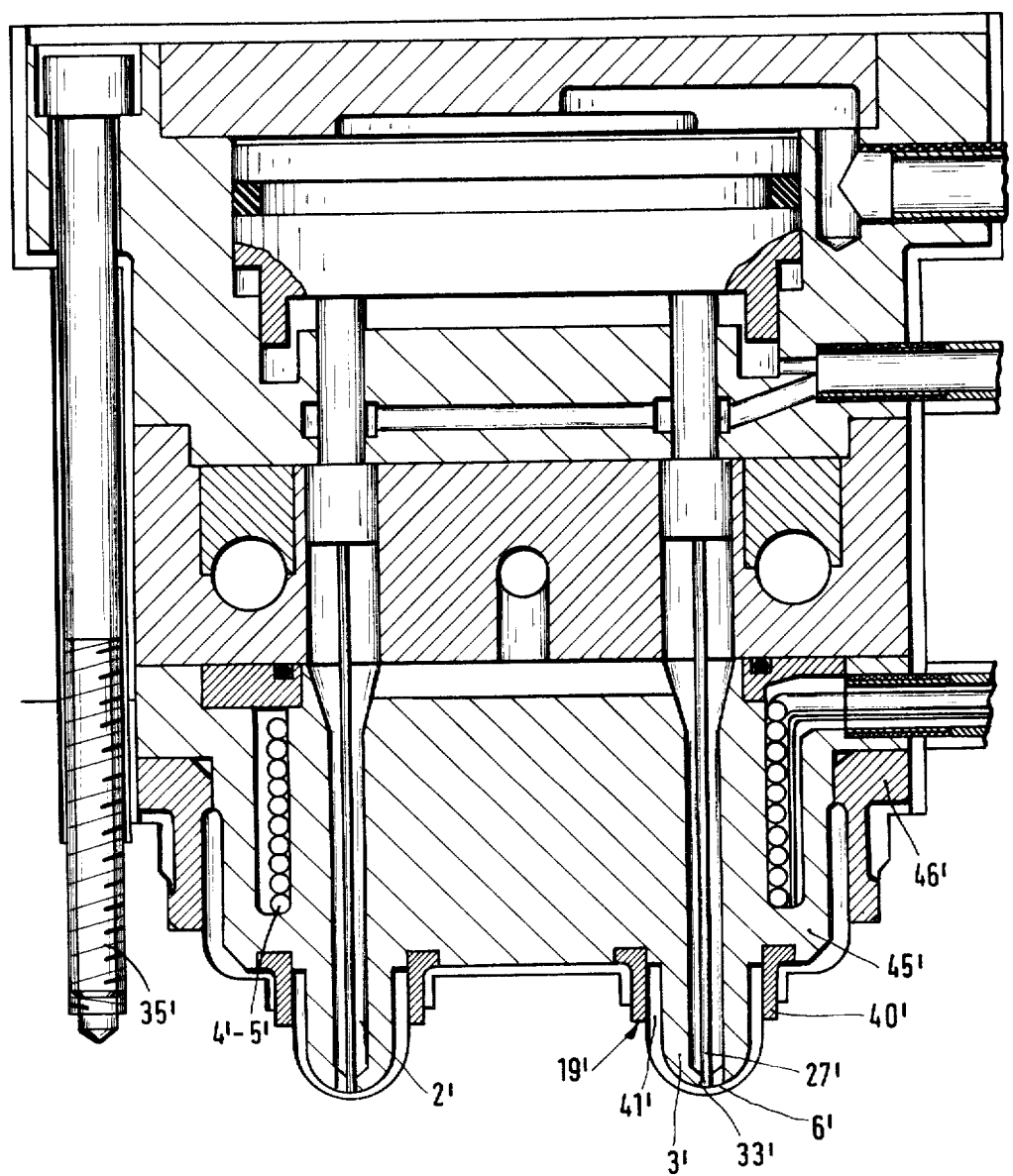

FIG. 12—a cross-section of the injection mechanism, with several free injection apertures in which an externally adjustable needle valve has been placed, which is placed in a hot runner injection molding arrangement, as part and parcel of the invention.

Figure 13:
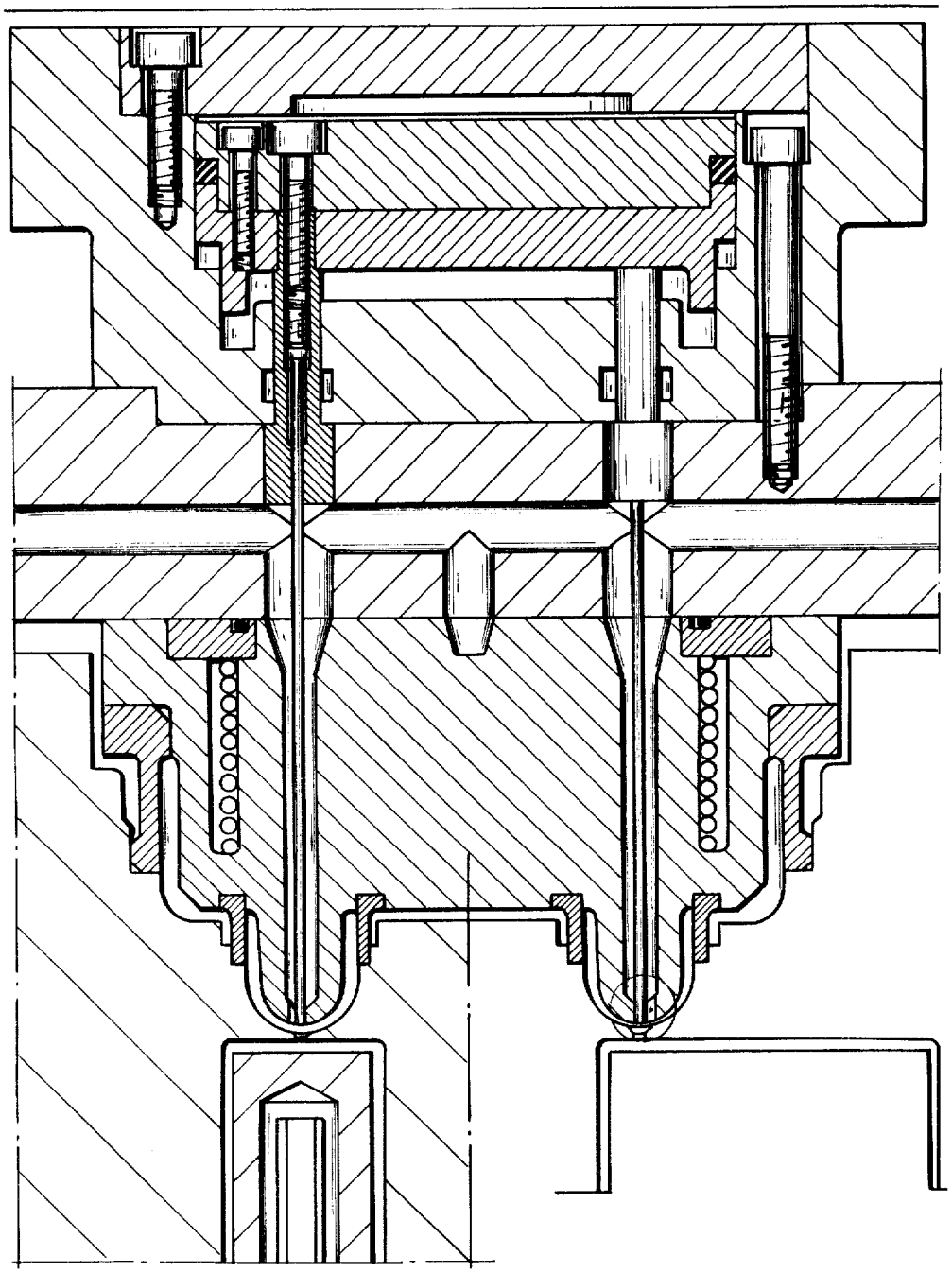

FIG. 13—a cross-section of FIG. 12 running through the center line, as part and parcel of the invention.

Referring to FIGS. 1 and 2, part of the entity of a heated distributor block 1 of an injection molding arrangement is shown, with injection bushing 2 through which the molten plastics enter the injection molding arrangement from the injection machine by way of distributor channels 3 and 4 and injection aperture 5 and are injected into the form cavity 6. The injection bushing 2 is provided with band heater element 7 and the heated distributor block 1 is provided with heater cartridges 8. Against the heated distributor block has been placed the injection nozzle 9 provided with distributor channel 4, which in turn is provided with the lower injection aperture 10. In the injection nozzle has been placed a cast-in heater element 11, provided with a thermocouple 12. This thermocouple should be located nearest the vicinity of the lower aperture, because this is the critical point as far as keeping the molten plastics in the space between the lower aperture 10 and the recess 13 in the form cavity plate 14 at the proper temperature. Near the lower aperture the plastics material are kept warm and are heated or cooled, depending on the temperature control of the injection nozzle. The injection nozzle 9 may be composed of different materials. The part which contains the distributor channel 4 is however always made from highly conductive material such as beryllium copper. The heater element 11 and thermocouple may be integrally cast or not.

Because the temperature of the injection nozzle can be controlled externally by means of an installed thermocouple, the temperature of the lower aperture can be managed accurately. This is of great importance in injection molding of so-called engineering materials having a narrow processing temperature range such that the molten plastics are either too cold and resistant to flow or too hot and thus are burned and become unfit for use. On the side of recess 13 in form cavity 14 the molten plastics are cooled off locally because the form cavity plate is cooled off by a cooling fluid in cooling channels 15. Because in the described system the temperatures of both above-mentioned sides 10 and 13 can be controlled and particularly at the location of side 10, injection molding with the described system will be performed without problems.

The closure between the injection nozzle and the heated distributor block is obtained by a special gasket 16. In order to incur as little as possible heat conduction losses, a spacer and centering bushing 17 is placed between injection nozzle 9 and the form cavity plate 14, in a manner as shown in the attached drawings FIG. 1 through 6. Mathematically it can be shown that this design provides 6 to 10 times less heat conductivity and therefore also 6 to 10 times less heat loss. In order to position the injection nozzle accurately opposite the the injection opening 5, the spacer and centering bushing 17 is used. The injection nozzle is centered with respect to the rim 18 in the spacer and centering bushing, which in turn is centered in the form cavity plate 14 with respect to the diameter 19. The surfaces 20 and 21 of the spacer and centering bushing 17 will have to be coaxial within predetermined tolerances.

Installing the spacer and centering bushings provides airspace 22 between bushing 17 and injection nozzle 9. This space 22 will be filled with plastics and will provide the proper thermal insulation between both mentioned parts 9 and 14. The installation of the spacer and centering bushing 17 also provides an air gap 23 resulting in a second thermal insulation between injection nozzle 9 and form cavity plate 14. Installing injection nozzle 9 with high quality socket head cap screws 24 in the heated distributor block and by way of the spacer and locating ring 17 on form cavity plate 14, such a large, but still allowable, pressure is obtained on surface 25, that this results in an absolute closure against leakage of the molten plastics from the distributor channels 3 and 4.

Installation of the socket head cap screws also pulls the heated distributer block 1 against injection nozzle 9 resulting in both the proper closure as well as the proper heat flow from the heated distributor block in the direction of the injection nozzle. Because the mentioned parts are connected with each other by means of the socket head cap screws 24, the heated distributor block 1 does not need to be supported by a clamping plate of the injection molding arrangement, so that here also there are no contacting surfaces resulting in heat losses and the installation height of the injection molding arrangement can be kept smaller.

Correct adjustment should result in location of the front surface of the needle 26 of which the front end is cylindrical or nearly cylindrical, in the same plane as the surface of the product cavity of the injection molding arrangement.

At the start of the injection process, space 28 above the plunger is vented to atmosphere. At the same time, at the start of the injection cycle the pressure to which the molten plastics are subjected will press needle 26, which is connected to guide bushing 27, via the surface of the enlarged part of bushing 27 against frictional resistance, moving it a distance of about 4 mm, so that the molten plastics can enter the product cavity 6 by way of the injection opening 5. The enlarged portion provides an enlarged surface against which the injection pressure of the molten plastics can act resulting in a large force for opening the needle valve. The enlarged portion of the guide bushing 27 forms a collar at the front end of the bushing which functions as a stop to the motion of the needle valve. The travel of needle 26, and thereby the travel of the plunger 30, 31 to which the guide bushing is attached by means of a socket head cap screw, is limited through contact of the shoulder of the guide bushing 27 against a surface in the bore in the heated distributor block. The presence of the collar also permits the rest of the guide bushing to be of small diameter resulting in a large ratio of length to diameter.

As soon as the injection cycle has been terminated, the pressure in the distributor channels 3 and 4 will increase no longer and if the injection nozzle 57 of the injection machine (see FIG. 6), after termination of the injection cycle, is pulled back in the injection bushing 2, the existing pressure in the distributor channels 3 and 4 will be reduced rapidly and if there exists a proper fit between the injection nozzle and the injection bushing a vacuum will even result in the distributor channels.

The instant the total injection cycle is terminated, a signal from within the injection machine will cause compressed air to press on surface 29 of the plunger consisting of parts 30 and 31. In the plunger the guide bushing 27 has been installed which is secured against turning and in the guide bushing in turn the needle 26 is installed. The compressed air causes a force to act through which the plunger and thereby the needle 26 are moved downward with great force and speed, so that the injection opening 5 is closed and the front end of the needle 26 is caused to lie in one plane with the outside surface of the form cavity 6. As was described above, at the beginning of the injection of plastics, the compressed air is vented and the space 28 above surface 29 will lose its pressure.

The height of the closure of the point of the needle valve in the injection opening is not critical, because during the closed condition of the needle valve, no large pressure differences are occuring, so that closure against a ring-shaped surface of minor dimension (about 0.5 mm) suffices. In order to minimize wear during operation, the edge of the bottom front surface of the needle is provided with a radius of about 0.2 mm. In addition, the corresponding inside edge of the injection aperture in the recess 13 is chamfered.

The plunger consisting of parts 30 and 31 which are held together by socket head cap screws 33 are located with respect to each other through the accurate male-female fit 34 between the two. In addition the plunger contains a gasket ring 32. Axially movable guide bushing 27 is installed in the plunger with ample clearance but secured against rotation with cap screw 35, so that independant guiding of the plunger assembly as well as guide bushing 27 with respect to each other are assured. To prevent rotation of the guide bushing 27 with cap screw 35 during assembly or disassembly, the guide bushing 27 is provided with one or more flat spots corresponding with one or more flat spots in the plunger.

Leakage around the plunger is prevented by the gasket 32 and after completion of its travel, surface 36 of the plunger will be in contact with surface 37 of the heated distributor block, so that air which could escape around the gasket 32, should it become worn, is stopped anyway. Should, after a time, seats 36 or 37 become damaged, the compressed air is still up against the barrier provided by the close fit between parts 1 and 31.

A standard commercially available pin having a cylindrical or conical head is used as a needle valve 26 and the needle valve is attached to the guide bushing 27 by means of one or more lock screws 65 and locked in the desired position.

The parts 30, 31 and 27 can easily be manufactured to the required tolerances, since they have a round geometry. This also goes for the corresponding bores for these parts in the heated distributor block. For convenient assembly and disassembly of the plunger and the needle valve, the heated distributor block 1 is provided with a cover 39, which is attached by means of socket head cap screws 40. This has the advantage that in case of break down in the described system, assembly and disassembly can be executed easily during the injection molding process, without having to remove the injection molding arrangement from the injection machine.

The closure against leakage of the molten plastics around the guide bushing 27 in the heated distributor block is obtained by an accurate fit of the one part within the other and by a large ratio of length versus diameter. To prevent wear in the heated distributor block, guide bushing 27 is heat treated, so that the hardness of the latter is lower than that of the distributor block. Should some molten plastic leak through, it will be collected in groove or recess 41 from where it will run out via channel 42 and tube 43. This drainage will be facilitated during admittance of compressed air to the plunger since during the plunger's downward travel air within the space 58 is compressed and expelled by way of channel 59 which is connected to the underside of the bore in which the plunger is located, and tube 43 causing a partial vacuum in channel 42 one or more recesses 41 may be present.

When corrosive plastics are to be used, the distribution channels are covered with a protective surface layer.

In FIGS. 2 and 3 it can be seen that the lead wires from the heater element and the thermocouple are brought to the outside through installed tube 44 to prevent damage in assembly and should leakage of molten plastics take place. Compressed air is supplied and vented through tube 45.

In FIG. 3 the application of a manifold design of the injection nozzle with several needle valves is shown.

As many lower nozzles or injection openings 10, 5 are contained in the manifold version as there are needle valves 26. To this design the operation and all applications and characteristics of the single design as mentioned above and to be mentioned below, are applicable, subject to the condition that the injection nozzle has to be secured against rotation outside the diameter of the spacer and centering bushing.

A manifold design also may be provided having one injection bushing for receiving plastics from an injection molding machine or one injection nozzle but without needle valves for injection molding more than one product or injection molding one large product from several locations.

In FIGS. 4 and 5 the design of the central location is shown to which the principles as mentioned in FIG. 3 are also applicable. The parts 46 are band heater elements.

With reference to FIG. 6, the operation of a design in which the plunger is placed within a not directly heated distributor block 60 is described. To this design the operation and all applications and characteristics of the single and manifold design as mentioned above and to be mentioned below are applicable.

The molten plastics within this distributor block are kept at the proper temperature by heated tubes 47. The above-mentioned injection nozzle 9 is now composed of parts 48, 49 and 50. The heater element 11, controlled by the internally installed thermocouple 12, will keep this injection nozzle at the desired temperature. To reduce heat conduction losses, part 49 contacts the distributor block 60 only with the narrow edge 51 which also goes for part 50 with edge 52.

Because part 49 is heated and is made from a highly conductive material, e.g. beryllium copper, the molten plastics which flow from distributor channels 53 to part 49, will flow to injection aperture 5 from distributor channels 54 and 55, whence to the product cavity.

Above, in FIGS. 1 through 6, preferential designs of the single and manifold needle valves have been described in accordance with the invention. However, it will be evident that within the framework of the invention several variations of the details are possible. Those parts which in accordance with the drawings have been designed to be operated with Allen wrenches, may be suited for operation with other tools, such as a screw driver. Moreover, the plunger may be activated pneumatically, hydraulically or by one or more springs and its motion may be derived from a mechanism outside the part in which the injection mechanism is installed. The needle valve 26 may be installed directly in the plunger, in which case guide bushing 27 is eliminated and the plunger must be made double acting. The injection nozzle can also be composed from parts such as 48, 49 and 50.

Referring to FIGS. 7 and 7a, the reference number 8' indicates the installation plate of the injection mechanism with injection opening 21' through which the molten plastics enter the injection mechanism from the injection machine and are injected via the distributor channels 20' and 2' and the injection aperture 11' into the cavity 22'.

Against installation plate 8' has been placed the injection nozzle 1', which has been provided with distributor channel 2' running into the injection aperture 3'. The injection nozzle has been cast around a heater element 4' which is provided with thermocouple 5'. This thermocouple should be located as closely as possible in the vicinity of the lower aperture, because this is the critical point as far as the correct temperatures of the molten plastics are concerned. The molten plastics fill the space between the lower aperture 3' and the recess 6' in the cavity plate 7'. Near the lower aperture the plastics are kept warm, and are heated or cooled depending on the temperature control of the injection nozzle.

Because the temperature of the injection nozzle can be controlled externally by virtue of the installation of a thermocouple, the temperature of the lower aperture can be exactly regulated. This is of extreme importance in injection molding of the so-called technical plastics which have a narrow processing temperature range such that if the molten plastics are too cold, they flow with difficulty or if too hot, they are burned and are destroyed. In the recess 6' in the cavity plate 7' the molten plastics are cooled off because the cavity plate is cooled by means of a coolant flowing in cooling channels. Because in the described system the temperature of both mentioned sides 3' and 7' can be regulated and especially side 3', it will be possible to injection mold with the described system without problems.

The closure between the injection nozzle and the installation plate 8' is obtained by the special gasket 9'. In order to restrict heat losses as much as possible, a spacer and centering ring 10' is placed between injection nozzle 1' and cavity plate 7', which is designed as shown in the attached drawings, FIGS. 7 through 13. It can be proven mathematically that this design reduces heat conduction 6–10 times and thus reduces heat losses 6–10 times. In order to place the injection nozzle exactly opposite the injection aperture 11', the spacer and centering ring 10' is utilized. On one end the injection nozzle is centered on edge 12' in the spacer and centering ring, which in turn is centered in the cavity plate 7' on diameter 13'. Surfaces 14' and 15' of the spacer and centering ring 10' therefore will be coaxial with each other within predetermined tolerances.

Installation of the spacer and centering ring results in an air space 16' between ring 10' and the injection nozzle 1'. This space 16' will be filled with plastics resulting in the proper thermal insulation between abovementioned parts 1' and 7'. Installation of the spacer and centering ring 10' also results in an air space 17', providing a second thermal insulation between injection nozzle 1' and cavity plate 7'.

In assembling the injection nozzle 1' by means of high strength socket head cap screws and the spacer and centering ring 10', to cavity plate 7', such a high unit pressure (but still allowable) is obtained on surface 19', that this results in absolute closure against leakage of molten plastics from distributor channels 2' and 20'.

Installation of the socket head cap screws pulls installation plate 8' against the injection nozzle as well, also resulting in proper closure as well as proper heat flow from the injection nozzle in the direction of the installation plate. To obtain proper centering of parts 1' and 8', a centering ring 23' is installed whereas an exchangeable bushing 24' has been installed in installation plate 8'.

In FIGS. 8 and 8a, the injection molding mechanism of FIG. 7, has been installed such that the injection nozzle 1' is placed against the heated distributor block 25' (hot runner beam) and the installation plate 8' is placed on the heated distributor block. The installation plate 8' is provided with a centering edge 43' which fits accurately within the centering bore 44' in the hot runner beam 25'. With the socket head cap screws placed in the installation plate (not shown here but shown in FIGS. 10 and 10a, ref. no. 35'), the heated distributor block 25' and the injection nozzle 1' are bolted to the cavity plate 26'. Thus it is possible to utilize the injection molding mechanism shown in FIG. 7, which is here placed centrally in an injection molding mechanism, in a hot runner design in that the hot runner beam is placed between installation plate 8' and injection nozzle 1', without the necessity to make any changes at all in parts 1' and 8'.

In FIGS. 9 and 9a, the injection molding mechanism shown in FIG. 7, has been installed such that here the injection molding mechanism has been provided with an externally adjustable fixed needle 27'. In removing bushing 24' of FIG. 7 and in replacing this by needle bushing 28', an injection molding mechanism is obtained with a free injection aperture provided with an externally adjustable fixed needle.

The needle bushing 28' has been provided with several bores 29', through which the molten plastics flow from the injection molding machine via injection aperture 21' and the distributor channels 2' and 20' to the cavity 22'.

The needle bushing 28' is provided with a collar 42', which is clamped with a light press fit between the injection nozzle 1' and adaptor plate 8' in order to obtain the proper heat conductivity. Also for this purpose the needle bushing is made from a highly conductive material, i.e. beryllium copper, which can be provided with a protective surface in case corrosive plastics are processed. The collar 42' causes the needle bushing 28' to be centered correctly in the adaptor plate 8' so that a needle 27' installed in the needle bushing 28' is centered accurately in the middle of the distributor channel 2' and injection aperture 32'.

The needle 27' is threaded on one end and provided with a hexagon socket. The thread fits within the internal screw thread in the needle bushing 28' such that the needle 27' is adjustable and can be locked in any position by means of one or more set screws 30'. In order to close the threaded hole, cap 31' has been installed. The cap 31' prevents plastics from entering the hole and improves the flow pattern of the entering molten plastics. The point of the needle can now be positioned in the injection aperture 32' to such extent that on the product to be injection molded no objectionable spot will result.

In order to center the needle in the injection aperture 32', the lower part 3' of the injection nozzle 1' has been designed such that the needle is centered between several points 33'.

It is even possible to make the fit between the needle and the centering points so close that the needle is in contact with the centering points and this results in flow of heat from the lower part of the nozzle 3', which is heated by the heating element in the nozzle, to the lower tip 34' of the needle to such a temperature that the plastics in injection aperture 32' can not freeze, and the aperture thus remains open. To obtain a proper heat flow via the needle to point 34', the needle is made of a high conductive material such as beryllium copper. An injection nozzle can be provided with a plurality of such fixed needles.

FIGS. 10 and 10a are is the injection molding mechanism of FIG. 9, installed such that here the injection nozzle 1' is placed against the hot runner beam 25' and the installation plate 8' containing the needle bushing 28', needle 27', and the lock screw 30', is placed on the hot runner beam. Installation plate 8' has a centering edge 43' which fits accurately in the centering bore 44' of hot runner beam 25'. This centering and the centering ring of the injection nozzle via the spacer and centering ring in the cavity plate, causes needle 27' to be aligned with the injection aperture, with the socket head cap screws 35' bolting the installation plate 8', the hot runner beam and the injection nozzle against cavity plate 26'. Here again the injection molding mechanism of FIGS. 7 and 9 which are installed centrally in an injection molding arrangement, can be utilized in a hot runner design through placement of the hot runner beam between installation plate 8' and the injection nozzle 1', without any change to parts 1', 8' and 28'. The adaptor plate 8' contains bolt holes 38' in a standardized pattern which permits universal application of the apparatus to all modes of injection molding.

In FIGS. 11 and 11a the injection mechanism has been installed such that here again the same injection nozzle 1' has been utilized on top of which the same hot runner beam 25' has been placed, to which the needle valve as part of assembly 36' has been assembled. The entire assembly is bolted to the cavity plate 26' by means of the socket head cap screws 35'.

The needle valve contained in assembly 36' has been described in connection with FIGS. 1–6 of the present application. The injection mechanism described here, with one or more needle valves, has been installed here in a separate assembly 36', such that this can be manufactured more readily in series production. The alignment of the assembly 36' on the hot runner beam has been designed in the same manner and has the same dimensions as described in FIGS. 8 and 10.

Here also the needle valve 27' is aligned between several centering points 33' such as described in FIG. 3, this to obtain perfect location of the needle valve above the injection aperture 37', which must close off, so that the injection opening will not wear on one side only.

In FIGS. 7 through 11a identically the same injection nozzle 1' is utilized, as a complete unit as described in FIG. 7. It is therefore possible to realize all existing types of injection molding with one and the same injection nozzle, if this is placed centrally in an injection molding arrangement as well as if this is placed in a hot runner injection molding arrangement.

The selection of a fixed pattern of installation bolts 38' (shown in FIG. 10) renders this injection mechanism universally applicable.

In FIGS. 12 and 13 the design is shown of a manifold application of an injection molding arrangement with an injection nozzle 45' containing manifold lower apertures 3', in which are placed several needle valves 27'.

For the manifold design, the operation of all abovementioned and hereafter to be mentioned applications and characteristics of the single design, shown and described in FIGS. 7 through 11a, are applicable to this manifold design, subject to the condition that the injection nozzle 45' besides the alignment via spacer and centering ring 46', has been provided with spacer and centering rings 40'.

The lower injection apertures 3' have individual locating and centering rings 40' which help to align the injection nozzle 45' and allow the molten plastics to fill the air space 41' and assist in forming a proper closure between the lower injection apertures 3' and the cavity plate 26' so that no leakage of plastics can occur. The locating and centering ring 40' has the same function as the locating and centering ring 10 of FIG. 1. The injection mechanism for use with more than one injection opening may comprise one or more nozzles having a total number of nozzle apertures equal to the number of injection openings with each nozzle aperture having fixed adjustable needles or needle valves. The needles can be externally adjusted.

For the description of the operation of this mentioned needle valve reference is made to the description of FIGS. 1 through 6 of this application.

Above, in FIGS. 7 through 13 preferential designs of a single and manifold injection mechanism have been described according to the invention, but it is evident that within the framework of the invention, several variations of the design details are possible.

The parts which are conceived according to the drawings for servicing with the aid of Allen wrenches, can be conceived for servicing with other tools such as a screw driver.

I claim:

1. A mechanism for injecting plastics from an injection molding machine into one or more mold cavities via one or more gates in said one or more mold cavities, said mechanism comprising:

an injection bushing for receiving molten plastic from said injection molding machine;

more than one injection nozzle for injecting molten plastic into said one or more mold cavities, each of said nozzles having one or more nozzle conduits therethrough for passage of molten plastic, each said nozzle conduit terminating in a nozzle aperture positioned immediately opposite one of said mold cavity gates;

a distributor block for providing flow paths for the molten plastic between said receiving bushing and said injection nozzles, said distributor block including distributor channel means communicating with said nozzle conduits, said injection nozzles being connected to said distributor block;

means for maintaining the molten plastic at an adjusted temperature;

means for injecting the molten plastic from said injection bushing through said distributor channel means and said nozzle conduits into said mold cavity gates;

a needle valve positioned in each of said nozzle conduits for closing each respective mold cavity gate when moved longitudinally outwardly from said nozzle aperture;

a guide bushing slideably mounted for longitudinal movement in said distributor block opposite each said nozzle conduit, each said guide bushing having the end of one of said needle valves remote from said nozzle aperture fixedly mounted therein, each said guide bushing also having a surface area exposed to the molten plastic being injected through said distributor block whereby the pressure of the molten plastic when being injected by said injection means tends to move said guide bushing away from said nozzle aperture thereby moving said needle valve longitudinally and opening said mold cavity gate;

a chamber in said distributor block; and, one plunger slideably mounted in said distributor block chamber and connected to several of said guide bushings and thereby to their respective needle valves for moving said needle valves longitudinally outwardly to close their respective mold cavity gates, said plunger being actuated by fluid pressure and being adapted for longitudinal movement in the same direction as said needle valve to which said plunger is connected.

2. The mechanism of claim 1 and including means within each said guide bushing and said plunger for adjusting the fixed longitudinal position with respect to said guide bushing of said needle valve mounted in said guide bushing.

3. The mechanism of claim 2 wherein said adjusting means comprises adjustable screws and lock screws.

4. The mechanism of claim 1 wherein said distributor block includes a removable cover for providing access to said distributor block chamber and said plunger contained therein.

5. The mechanism of claim 1 wherein each of said guide bushing includes means about the sides thereof for collecting leakage of molten plastic from said distributor channel means.

6. The mechanism of claim 5 wherein:

said plunger and said distributor block chamber define a first space within said chamber above said plunger and a second space below said plunger, said fluid pressure for actuating said plunger being applied in said first space;

a drainage channel in said distributor block connected to each said leakage collecting means of each said guide bushing for draining molten plastic leakage from said guide bushing; and, an exhaust channel in said distributor block connected to said second space of said chamber and said drainage channel whereby fluid expelled from said second space causes a partial vacuum in said drainage channel thereby assisting in drainage.

7. The mechanism of claim 1 wherein:

each said guide bushing includes a collar about the periphery thereof, said collar being located at the end of each said guide bushing exposed to the molten plastic whereby the surface area of each said guide bushing exposed to the pressure of the molten plastic is increased, the wall of said distributor block at which each said guide bushing is mounted including an annular recess for said collar, each said collar and annular recess cooperating to provide a positive stop against said needle valve of each respective guide bushing from opening too far.

8. The mechanism of claim 1 wherein said plunger is actuated pneumatically.

9. The mechanism of claim 1 wherein said plunger is actuated hydraulically.

10. The mechanism of claim 1 wherein said plunger includes about the periphery thereof a gasket for providing a seal between said plunger and the wall of said distributor block chamber.

11. The mechanism of claim 10 wherein:

said plunger includes a shoulder in the peripheral wall thereof;

the wall of said distributor block chamber includes a seat adapted to receive said plunger shoulder;

said plunger shoulder being adapted to contact said seat after being actuated by said fluid pressure such that the fluid cannot pass said plunger shoulder and said seat in the event of leakage around said plunger gasket; and, the peripheral wall of said plunger and the wall of said distributor block chamber having a close fit thereby providing a third barrier against fluid leakage.

12. The mechanism of claim 4 wherein said plunger is composed of two parts forming an integral unit which can be removed and installed in said distributor block chamber through said removable cover.

13. The mechanism of claim 7 wherein each said guide bushing has a large ratio of length to diameter and a close fit with the wall of the distributor block at which said guide bushing is mounted thereby tending to prevent leakage of molten plastics.

14. The mechanism of claim 1 wherein said plunger and each said guide bushing have been provided with corresponding flat spots so that the guide bushing can be prevented from turning during assembly and disassembly.

15. The mechanism of claim 1 wherein said injection nozzles are each provided with a heating element having a thermocouple, the part of each said nozzle containing said one or more nozzle conduits being made from highly conductive material.

16. The mechanism of claim 1 wherein said distributor channel means are coated with a protective surface layer for processing corrosive plastics.

17. The mechanism of claim 1 and including adjustable fixed needles in one or more of said nozzle conduits of one or more of said injection nozzles, each fixed needle having a point positioned in its respective mold cavity gate for preventing a molded product from receiving an injection spot.

18. The mechanism of claim 1 wherein each said nozzle includes means for properly aligning said nozzle with respect to said one or more mold cavity gates and for insulating said nozzle with respect to said one or more mold cavities.

19. The mechanism of claim 1 wherein each said nozzle conduit includes therein at said nozzle aperture projecting points for engaging said needle valve in said nozzle conduit for assisting in centering said needle valve in said nozzle aperture.

20. The mechanism of claim 1 wherein at least one injection nozzle includes more than one nozzle conduit, each of said nozzle conduits having individual locating and centering means for properly aligning each said nozzle conduit with respect to its respective mold cavity gate and for forming a closure between said nozzle conduit and its respective mold cavity gate to prevent leakage of plastic, said injection nozzle also including an overall locating and centering means for said nozzle enclosing all said individual locating and centering means for properly aligning said nozzle with respect to said one or more mold cavity gates and for insulating said nozzle with respect to said one or more mold cavities.

* * * * *